United States Patent
Takami et al.

(10) Patent No.: US 12,095,028 B2
(45) Date of Patent: Sep. 17, 2024

(54) SECONDARY BATTERY, BATTERY PACK, VEHICLE, AND STATIONARY POWER SUPPLY

(71) Applicant: KABUSHIKI KAISHA TOSHIBA, Minato-ku (JP)

(72) Inventors: Norio Takami, Yokohama (JP); Takashi Kishi, Yokosuka (JP); Yasuhiro Harada, Isehara (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 137 days.

(21) Appl. No.: 17/007,038

(22) Filed: Aug. 31, 2020

(65) Prior Publication Data
US 2021/0296684 A1 Sep. 23, 2021

(30) Foreign Application Priority Data
Mar. 19, 2020 (JP) ................. 2020-049834

(51) Int. Cl.
*H01M 10/0562* (2010.01)
*H01M 4/38* (2006.01)
(Continued)

(52) U.S. Cl.
CPC ....... *H01M 10/0562* (2013.01); *H01M 4/382* (2013.01); *H01M 4/582* (2013.01);
(Continued)

(58) Field of Classification Search
CPC ............. H01M 4/582; H01M 10/0562; H01M 2300/008; H01M 2300/0022;
(Continued)

(56) References Cited

U.S. PATENT DOCUMENTS

| 4,508,795 A * | 4/1985 | Mamantov ........ H01M 10/3909 |
| | | 429/103 |
| 5,552,241 A | 9/1996 | Mamantov et al. |
| 6,511,773 B1 * | 1/2003 | Dampier ............. H01M 50/437 |
| | | 429/188 |

(Continued)

FOREIGN PATENT DOCUMENTS

| JP | WO2011/013254 A1 | 2/2011 |
| JP | 2013-161652 A | 8/2013 |
| JP | 2014-41722 A | 3/2014 |
| JP | 2017-59370 A | 3/2017 |
| JP | 2019-160748 A | 9/2019 |

OTHER PUBLICATIONS

Morita et al., "High Specific Energy Density Aqueous Lithium-Metal Chloride Rechargeable Batteries", Journal of The Electrochemical Society, 164(9), 2017, pp. A1958-A1964.

*Primary Examiner* — Jeremiah R Smith
(74) *Attorney, Agent, or Firm* — Oblon, McClelland, Maier & Neustadt, L.L.P.

(57) ABSTRACT

According to one embodiment, a secondary battery includes a positive electrode, a negative electrode, a nonaqueous electrolyte and a separator. The positive electrode includes a halide including one or more metal elements selected from the group consisting of copper, iron, nickel, cobalt, tin, and zinc. The negative electrode includes one or more selected from the group consisting of lithium metal, a lithium alloy, and a compound capable of having Li inserted and extracted. The nonaqueous electrolyte contains aluminum ions. The separator has lithium ion conductivity and is interposed between the positive electrode and the negative electrode.

13 Claims, 4 Drawing Sheets

(51) Int. Cl.
  *H01M 4/58* (2010.01)
  *H01M 10/0525* (2010.01)
  *H01M 4/02* (2006.01)

(52) U.S. Cl.
  CPC .............. *H01M 10/0525* (2013.01); *H01M 2004/027* (2013.01); *H01M 2004/028* (2013.01); *H01M 2220/10* (2013.01); *H01M 2220/20* (2013.01); *H01M 2300/008* (2013.01)

(58) Field of Classification Search
  CPC ...... H01M 4/134; H01M 4/136; H01M 4/382; H01M 10/0525; H01M 10/052; H01M 10/056; H01M 2300/0028
  See application file for complete search history.

(56) References Cited

U.S. PATENT DOCUMENTS

| | | | |
|---|---|---|---|
| 6,620,547 B1 * | 9/2003 | Sung .................. | H01M 4/13 |
| | | | 429/223 |
| 8,563,175 B2 | 10/2013 | Harada et al. | |
| 2012/0235644 A1 * | 9/2012 | Gordon ................ | H01M 10/36 |
| | | | 429/105 |
| 2016/0308253 A1 * | 10/2016 | Robins ................ | H01M 4/381 |
| 2017/0069888 A1 * | 3/2017 | Uchida ................ | H01M 50/20 |
| 2017/0077494 A1 * | 3/2017 | Iwasaki .............. | H01M 50/581 |
| 2018/0277894 A1 * | 9/2018 | Pan .................. | H01M 10/0569 |
| 2019/0214685 A1 * | 7/2019 | Chang ................ | H01M 50/411 |
| 2020/0194823 A1 * | 6/2020 | Takami ............... | H01M 50/449 |
| 2021/0296684 A1 * | 9/2021 | Takami ............... | H01M 4/582 |
| 2022/0085369 A1 * | 3/2022 | Takami ............... | H01M 4/582 |

\* cited by examiner

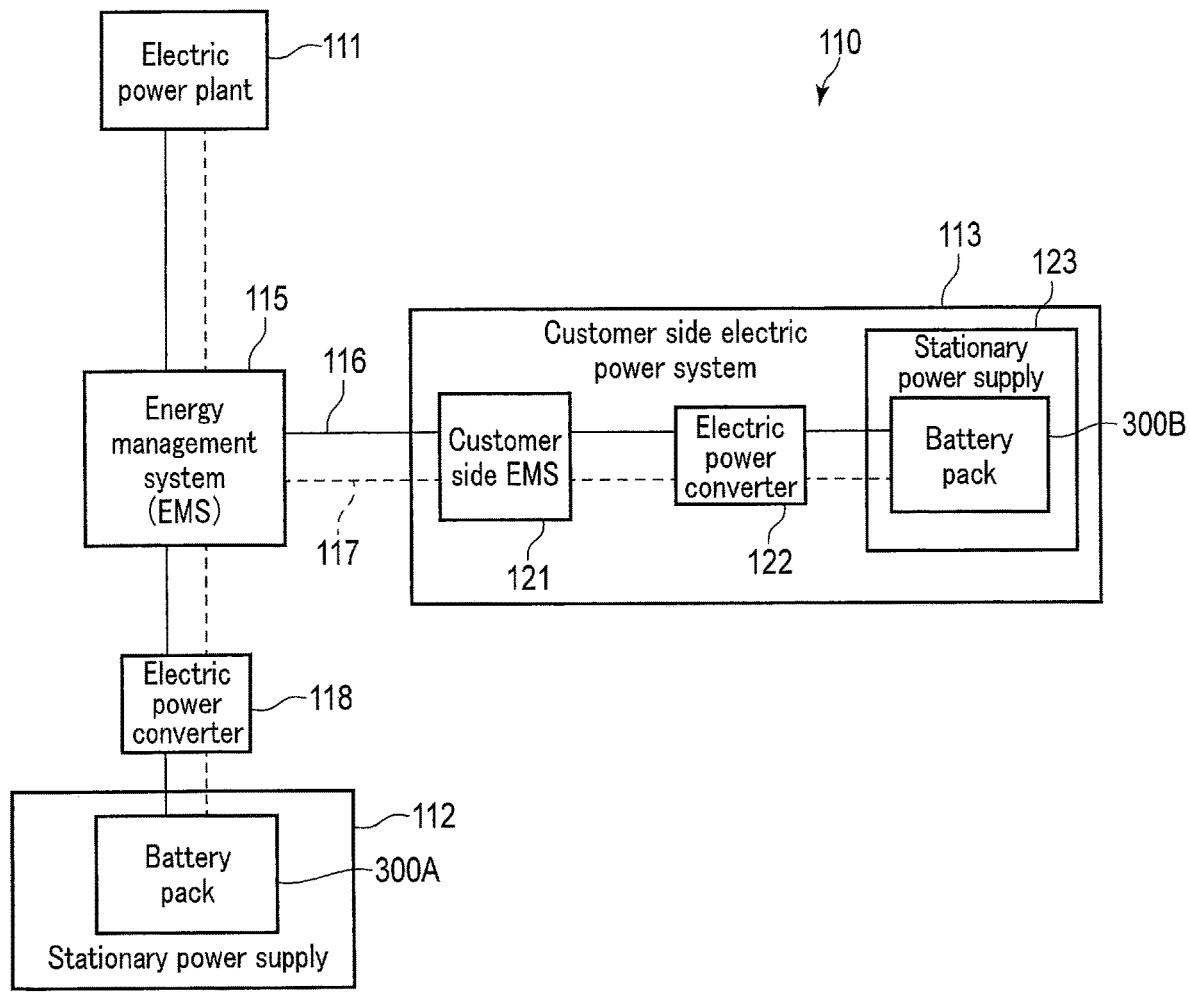
F I G. 5

SECONDARY BATTERY, BATTERY PACK, VEHICLE, AND STATIONARY POWER SUPPLY

CROSS-REFERENCE TO RELATED APPLICATIONS

This application is based upon and claims the benefit of priority from Japanese Patent Application No. 2020-049834, filed Mar. 19, 2020, the entire contents of which are incorporated herein by reference.

FIELD

Embodiments described herein generally relate to a secondary battery, a battery pack, a vehicle, and a stationary power supply.

BACKGROUND

Nonaqueous electrolyte batteries using lithium metal, lithium alloys, lithium compounds, or carbonaceous materials for a negative electrode have been envisaged as a battery having a high energy density and have been actively researched and developed. So far, a lithium ion battery that has a positive electrode including $LiCoO_2$ or $LiMn_2O_4$ as an active material, and a negative electrode including a carbonaceous material having lithium ions inserted and extracted has been widely commercialized for portable devices. To promote its applicability to electric automobiles and/or stationary storage batteries, not only enhancing the energy density and capacity of a secondary battery but also improving its durability life performance, low-temperature performance, and safety have been demanded. To enhance the energy density of a secondary battery, a battery including a metal negative electrode (e.g., Li, Na, Mg, Al), a battery having a positive electrode including sulfur, or a battery using an air electrode for the positive electrode have been researched and developed as a post-lithium ion battery; however, it has been difficult to cope with both a high energy density and the durability life performance.

In the battery including a metal negative electrode, using Li metal for the metal negative electrode presents a problem such as a short circuit due to dendrite deposition, and using Mg metal for the metal negative electrode increases an overvoltage and presents a problem of a low cycle life performance. On the other hand, in recent years, metal halides such as $CuCl_2$, $NiCl_2$, $CoCl_2$, and $FeCl_2$ have been studied as a next-generation positive electrode active material with a high capacity; however, the metal halides employ an aqueous solution or an organic solvent as an electrolyte solution, which presents the problem of a bad charge/discharge efficiency and a large overvoltage as well, and thus have not been commercialized. In particular, with an electrolyte solution made of an aqueous solution, hydrogen is easily generated from a positive electrode during discharge, which lowers the charge/discharge efficiency and shortens the cycle life. In addition, sulfur has been studied for use as a high-capacity and low-cost positive electrode material; however, sulfur, which has no electro-conductivity and thus is low in charge and discharge rate performance, and is dissolved in the electrolyte solution and thus presents a problem of a lower cycle life performance, has not been put into actual use.

BRIEF DESCRIPTION OF THE DRAWINGS

FIG. 5 is a block diagram showing an example of a system including a stationary power supply according to an embodiment.

DETAILED DESCRIPTION

Figure 1:
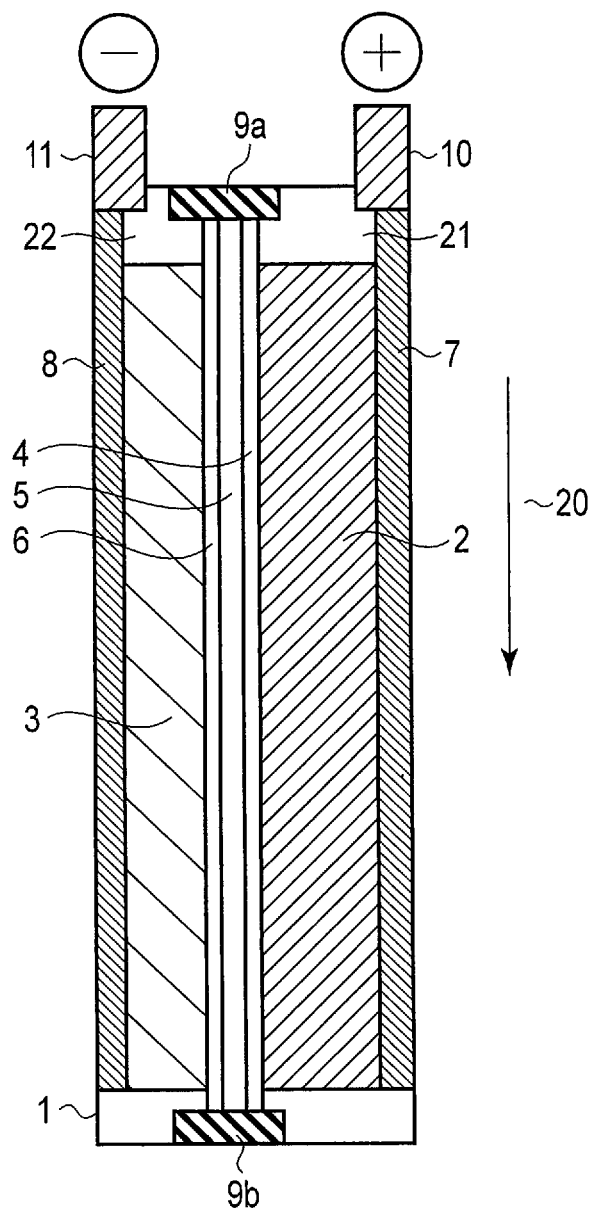
FIG. 1 is a cross-sectional view of a secondary battery according to an embodiment, taken in parallel with a first direction.

According to one embodiment, a secondary battery includes a positive electrode, a negative electrode, a nonaqueous electrolyte and a separator. The positive electrode includes a halide including one or more metal elements selected from the group consisting of copper, iron, nickel, cobalt, tin, and zinc, as a positive electrode active material. The negative electrode includes one or more selected from the group consisting of lithium metal, a lithium alloy, and a compound capable of having Li inserted and extracted, as a negative electrode active material. The nonaqueous electrolyte contains aluminum ions. The separator has lithium ion conductivity and is interposed between the positive electrode and the negative electrode.

According to another embodiment, a battery pack includes the secondary battery according to the embodiment.

According to another embodiment, a vehicle includes the battery pack according to the embodiment.

According to another embodiment, a stationary power supply includes the battery pack according to the embodiment.

First Embodiment

A secondary battery according to a first embodiment includes a positive electrode, a negative electrode, a nonaqueous electrolyte, and a separator having lithium ion conductivity. The positive electrode includes a halide including one or more metal elements selected from the group consisting of copper, iron, nickel, cobalt, tin, and zinc, as a positive electrode active material. The negative electrode includes one or more selected from the group consisting of lithium metal, a lithium alloy, and a compound capable of having Li inserted and extracted, as a negative electrode active material. The nonaqueous electrolyte contains aluminum ions. The separator having lithium ion conductivity is interposed between the positive electrode and the negative electrode.

When the separator having lithium ion conductivity includes a substance that is selectively permeable to lithium ions, for example, a lithium-ion conductive solid electrolyte, the secondary battery displays the following fundamental battery reaction. In the discharge reaction, lithium ions ($Li^+$) extracted from the negative electrode pass through the lithium-ion conductive separator to move to the positive electrode. On the other hand, a halide ($MX_n$) including one or more metal elements M selected from the group consisting of copper, iron, nickel, cobalt, tin, and zinc, included in the positive electrode active material, is reduced through the reaction with lithium, resulting in the metal element M and nLiX being deposited. This reaction is represented by the following equation (1). The reaction of equation (1), namely, the dissolution-deposition reactions due to the oxidization-reduction reactions of the halide including the metal element M can readily proceed in the nonaqueous electrolyte containing aluminum ions, for example, a liquid or gel nonaqueous electrolyte including an aluminum salt and an ionic liquid. As a result, the efficiency of the charge-discharge reactions increase, which can diminish the overvoltage.

$$MX_n + nLi^+ + ne^- = M + nLiX \quad (1)$$

The lithium-ion conductive solid electrolyte is selectively permeable to lithium ions. Thus, cations of the metal element M cannot permeate the lithium-ion conductive solid electrolyte and remain on the positive electrode side. In addition, the presence of the nonaqueous electrolyte containing aluminum ions allows the production of an aluminum halide (e.g., $AlCl_3$) in the discharge reaction. The aluminum halide, such as $AlCl_3$, dissolves to release the halogen ion in the charge reaction. This consequently promotes the production reaction for the halide of the metal element M with the charge reaction proceeding, which in turn increases the efficiency of the charge-discharge reactions and can diminish the overvoltage.

Accordingly, the oxidation-reduction reactions according to the dissolution and deposition of the metal element M can be performed efficiently and smoothly in the halide of the metal element M that is the positive electrode active material, thereby a secondary battery having a high energy density and excellent durability in life performance can be provided.

The electromotive force V (vs. $Li/Li^+$) of the positive electrode through the reaction of equation (1) varies depending on the kind of positive electrode active material. For example, a positive electrode including $CuCl_2$ yields 3.4 V (vs. $Li/Li^+$), a positive electrode including $NiCl_2$ yields 2.8 V (vs. $Li/Li^+$), and a positive electrode including $FeCl_2$ yields 2.6 V (vs. $Li/Li^+$). The positive electrode including $CuCl_2$ has a high voltage and thus is preferable.

Hereinafter, the positive electrode, the negative electrode, the separator, and the nonaqueous electrolyte will be described.

(1) Positive Electrode

The positive electrode includes: a positive electrode active material containing layer including a positive electrode active material; and a positive electrode current collector that is in contact with the positive electrode active material containing layer.

The positive electrode active material includes a halide including one or more metal elements selected from the group consisting of copper, iron, nickel, cobalt, tin, and zinc. For the halogen ion, a fluorine ion ($F^-$) or a chlorine ion ($Cl^-$) is preferable. This is because a high voltage can be obtained and because the charge reaction proceeds smoothly. Examples of a preferable metal halide include $CuF_x$ (0<x≤2), $CuCl_x$ (0<x≤2), $FeF_x$ (0<x≤3), $FeCl_x$ (0<x≤3), $NiCl_x$ (0<x≤2), $CoF_x$ (0<x≤3), $CoCl_x$ (0<x≤3), $SnCl_x$ (0<x≤2), and $ZnCl_2$. A more preferable metal halide is $CuCl_2$, $CuF_2$, or $FeF_3$, which attains a high voltage and a high capacity. The kinds of the halide to be used can be one, two, or more.

The positive electrode active material containing layer may include an electro-conductive agent. Examples of the electro-conductive agent include a carbon material, such as carbon nanofibers, acetylene black, and graphite. The above kinds of carbon material can improve the network of electrons in the positive electrode. There can be one, two, or more kinds of electro-conductive agent. The proportion of the electro-conductive agent in the positive electrode active material containing layer (excluding the weight of electrolyte) is preferably from 5 to 40 wt %.

The positive electrode active material containing layer may include a binder. Examples of the binder include polyethylene terephthalate, polysulfone, polyimide, cellulose, and rubber. The above kinds of binder are excellent in chemical stability with regard to a nonaqueous electrolyte containing aluminum ions. The proportion of the binder in the positive electrode active material containing layer (excluding the weight of electrolyte) is preferably from 1 to 10 wt %.

Examples of the positive electrode current collector include a porous material, mesh or foil made of one or more metal elements selected from the group consisting of copper, iron, nickel, cobalt, tin, and zinc. Preferable examples of the metal element include copper, nickel, iron, and an alloy including one or more of these. A metal element of the same kind as included in the metal halide is preferable. This allows the positive electrode current collector to be also used as the active material in charging. A porosity of the porous material is preferably from 30 to 98%, and more preferably in the range of from 50 to 60%. A thickness of the positive electrode current collector is preferably from 10 to 20 μm.

The thickness of the positive electrode varies according to the shapes and applications required of the electrode. When an electrode group takes a stacked structure or a wound structure, the thickness of the positive electrode is preferably 30 to 200 μm in a high-output application, and 200 to 1000 μm in a high-energy application.

(2) Nonaqueous Electrolyte Containing Aluminum Ions

It is desirable that the nonaqueous electrolyte containing aluminum ions is in contact with the positive electrode or is included or held in the positive electrode. This allows the charge-discharge reactions of the positive electrode to occur in the presence of aluminum ions.

When the positive electrode active material containing layer of the positive electrode has a porous structure, the positive electrode active material containing layer can hold or contain the nonaqueous electrolyte containing aluminum ions. The proportion of the nonaqueous electrolyte in the positive electrode active material containing layer is preferably in the range of from 10 to 60 wt %. The proportion being 10 wt % or more can increase the effective area for the electrochemical reaction, which can improve the battery capacity and attain resistance suppression. The proportion being 60 wt % or less increases the positive electrode weight proportion, which can improve the battery capacity.

Examples of the nonaqueous electrolyte containing aluminum ions include an organic solvent containing aluminum ions, an ionic liquid containing aluminum ions, and a mixture thereof. The nonaqueous electrolyte containing aluminum ions is preferably in the form of a liquid or gel. The gel electrolyte is obtained, for example, by adding a polymeric material and a gelling agent to a liquid electrolyte to form a gel.

The aluminum ions can form a complex ion made of an aluminum ion and a halogen ion. The aluminum ions can exist as an aluminum chloride anion, such as $Al_2Cl_7^-$ or $AlCl_4^-$, in the nonaqueous electrolyte. The aluminum ions can be supplied, for example, from an aluminum salt. Examples of the aluminum salt include an aluminum halide represented by $AlX_3$ (X is a halogen ion), $Al[FSO_2N]_3$, $Al[CF_3SO_2)N]_3$, and $Al[C_2F_5SO_2)N]_3$. Of the aluminum halides, $AlCl_3$, $AlBr_3$, $AlI_3$, or the like is preferable. The kinds of the aluminum salt may be one, two, or more.

Examples of the organic solvent include acetonitrile, propionitrile, methoxyacetonitrile, 3-methoxypropionitrile, an alkylsulfone, N-methylacetamide, γ-butyrolactone, and propylene carbonate. Examples of the alkylsulfone include dimethylsulfone, diethylsulfone, methylethylsulfone, and dipropylsulfone. Of these examples, dipropyl sulfone, which has a low melting point, is preferable. The kinds of the organic solvent may be one, two, or more.

The ionic liquid may be made of a cation and an anion. The cation may be, for example, a cation having a framework shown in Chemical Formula 1. Examples of the ionic liquid include an imidazolium salt and a quaternary ammonium salt. The kinds of the ionic liquid may be one, two, or more.

[Chemical Formula 1]

Examples of the imidazolium salt include a salt made of an alkylimidazolium ion and an anion to be paired therewith. As the alkylimidazolium ion, a dialkylimidazolium ion, a trialkylimidazolium ion, a tetraalkylimidazolium ion, or the like is preferable. Examples of the dialkylimidazolium include 1-methyl-3-ethylimidazolium ion (MEI$^+$). Examples of the trialkylimidazolium ion include 1,2-dimethyl-3-propylimidazolium ion (DMPI$^+$). Examples of the tetraalkylimidazolium ion include 1,2-diethyl-3,4(5)-dimethylimidazolium ion. On the other hand, examples of the anion include a halogen ion such as Cl$^-$, Br$^-$, and I$^-$, BF$_4^-$, PF$_6^-$, AsF$_6^-$, ClO$_4^-$, CF$_3$SO$_3^-$, CF$_3$COO$^-$, CH$_3$CO$^-$, CO$_3^{2-}$, [(FSO$_2$)$_2$N]$^-$, [(CF$_3$SO$_2$)$_2$N]$^-$, [(C$_2$F$_5$SO$_2$)$_2$N]$^-$, and (CF$_3$SO$_2$)$_3$C$^-$. The kinds of each ion may be one, two, or more.

The quaternary ammonium salt may be a salt made of a quaternary ammonium ion and an anion to be paired therewith. Examples of the quaternary ammonium ion include a tetraalkylammonium ion and a cyclic ammonium ion. Examples of the tetraalkylammonium ion include dimethylethylmethoxyethylammonium ion, dimethylethylmethoxymethylammonium ion, dimethylethylethoxyethylammonium ion, and trimethylpropylammonium ion (TMPA$^+$). On the other hand, examples of the anion include a halogen ion such as Cl$^-$, Br$^-$, and I$^-$, BF$_4^-$, PF$_6^-$, AsF$_6^-$, ClO$_4^-$, CF$_3$SO$_3^-$, CF$_3$COO$^-$, CH$_3$CO$^-$, CO$_3^{2-}$, [(FSO$_2$)$_2$N]$^-$, [(CF$_3$SO$_2$)$_2$N]$^-$, [(C$_2$F$_5$SO$_2$)$_2$N]$^-$, and (CF$_3$SO$_2$)$_3$C$^-$. The kinds of each ion may be one, two, or more.

By using the alkylimidazolium ion or the quaternary ammonium ion (in particular, the tetraalkylammonium ion), the melting point of the ionic liquid can decrease. Further, since the ionic liquid including the above ion has high electrochemical stability, its reactivity with the positive electrode in the charge-discharge reactions at the positive electrode can be lowered. This consequently can increase the efficiency of the charge-discharge reactions due to the dissolution-deposition reactions of the positive electrode active material, and thus improve the cycle life performance. Furthermore, the ionic liquid containing the above ion can suppress an overcharge reaction and an overdischarge reaction. As the discharge reaction proceeds, the metal deposition due to the reduction reaction of the metal element of the metal-element-M-containing halide occurs, and also the lithium ion concentration increases. When the lithium ion concentration reaches supersaturation, the lithium salt is deposited. As a result, in the overdischarge state, the lithium salt concentration and the aluminum ion concentration decrease in the positive electrode, which causes the ionic liquid to have a decreased ionic conductivity and to change a quasi-solidification. The overdischarge reaction ceases accordingly, which suppresses deterioration of the positive electrode due to the overdischarge. On the other hand, as the charge reaction proceeds, the deposited metal element is oxidized and eluted, and then deposited as the metal halide. In the overcharge reaction, since lithium ions in the positive electrode are depleted, ionic conduction in the lithium-ion conductive separator ceases. As a result, the overcharge reaction ceases, which suppresses deterioration of the positive electrode due to the overcharge reaction. Through such a reaction mechanism, the secondary battery will have a greatly improved safety and durability against the overcharge reaction and the overdischarge reaction, which can eliminate the need for a circuit for preventing overcharge and overdischarge.

The nonaqueous electrolyte containing aluminum ions may contain lithium ions and/or a lithium salt. In the discharge reaction of the secondary battery, as shown in equation (1), the reduction reaction of the metal element of the metal halide causes the metal deposition and the production of the lithium salt as well. Therefore, the lithium ion concentration in the nonaqueous electrolyte can increase as the discharge proceeds. Further, the electrolyte may become supersaturated with the lithium salt as the discharge reaction proceeds. In the nonaqueous electrolyte containing aluminum ions, lithium ions may be present before the discharge, i.e., before the use. The lithium ions may be supplied, for example, from a lithium salt. Examples of the lithium salt include LiPF$_6$, LiBF$_4$, LiClO$_4$, Li[(FSO$_2$)$_2$N], Li[(CF$_3$SO$_2$)$_2$N], and Li[(C$_2$F$_5$SO$_2$)$_2$N], etc. The kinds of the lithium salt may be one, two, or more.

In a mixed salt which uses AlX$_3$ for the aluminum salt, and uses the imidazolium salt and/or the quaternary ammonium salt (referred to as MX), when the number of moles of AlX$_3$ is taken as Y1 and the number of moles of MX as Y2, the mixture molar ratio represented by Y1/Y2 is preferably in the range of from 0.9 to 3. Within this range, the mixed salt is in a liquid state at ambient temperature, which can achieve a reduced charge/discharge resistance and a high charge/discharge efficiency in the positive electrode, and improve the cycle life performance. The mixture molar ratio is more preferably in the range of from 1 to 3. Within this range, the positive electrode can have a higher charge/discharge efficiency and an improved cycle life performance. In addition, the positive electrode can have a higher potential, and an increased capacity.

(3) Negative Electrode

The negative electrode includes one or more selected from the group consisting of lithium metal, a lithium alloy, and a compound capable of having Li inserted and extracted, as a negative electrode active material. The kinds of the negative electrode active material to be used may be one, two, or more. A negative electrode including lithium metal can increase the capacity and energy density of a secondary battery with a system voltage of 3V.

The compound capable of having Li inserted and extracted is a compound capable of having lithium or lithium ions inserted and extracted. Examples of the compound include lithium graphite and lithium carbon material having lithium ions inserted in advance.

Examples of the lithium alloy include alloys such as Li—Al, Li—Si, and Li—Zn.

Lithium metal and the lithium alloy may be in the form of a layer, and is preferably in the form of a foil.

The negative electrode may include a negative electrode active material containing layer. The negative electrode active material containing layer may contain an electro-conductive agent and/or a binder.

As the electro-conductive agent, for example, a carbon material, a metal compound powder, a metal powder, or the like can be used. Examples of the carbon material include acetylene black, carbon black, coke, carbon fibers, graphite, and carbon nanotubes. The BET specific surface by $N_2$ adsorption of the carbon material is preferably 10 $m^2/g$ or more. Examples of the metal compound powder include powders of TiO, TiC, and TiN. Examples of the metal powder include powders of Al, Ni, Cu, and Fe. Preferable examples of the electro-conductive agent include coke having an average particle diameter of 10 μm or less with a heat treatment temperature of 800° C. to 2000° C., graphite, and acetylene black, and carbon fibers having an average fiber diameter of 1 μm or less, and TiO powder. When one or more selected from these are used, the electrode resistance can be reduced and the cycle life performance can improve. The kinds of the electro-conductive agent can be one, two, or more.

Examples of the binder include polytetrafluoroethylene (PTFE), polyvinylidene fluoride (PVdF), fluorine-based rubber, acrylic rubber, styrene-butadiene rubber, a core-shell binder, polyimide, and carboxymethyl cellulose (CMC). The kinds of the binder may be 1, 2, or more.

The negative electrode active material containing layer containing a compound capable of having Li inserted and extracted (hereinafter, referred to as a first compound) is produced by, for example, suspending the first compound, the electro-conductive agent, and the binder in an appropriate solvent, applying the suspension to a current collector, and performing drying and pressing. The compounding ratios of the first compound, the electro-conductive agent, and the binder are preferably 80 to 95 wt % of the first compound, 3 to 18 wt % of the electro-conductive agent, and 2 to 7 wt % of the binder. A lithium metal foil or a lithium alloy foil may be used as the negative electrode active material containing layer.

The negative electrode may further include a negative electrode current collector. Examples of the negative electrode current collector include a foil or mesh including a metal, such as copper or nickel. The negative electrode current collector may be in contact with the negative electrode active material containing layer. The negative electrode current collector is preferably electrically connected to a negative electrode terminal via a lead.

The capacity of the negative electrode is preferably equal to or larger than that of the positive electrode.

The thickness of the negative electrode varies depending on electrode shapes and applications. When the electrode group takes a stacked structure or a wound structure, the thickness of the negative electrode is preferably 30 to 100 μm in a high-output application, and 100 to 500 μm in a high-energy application.

(4) Electrolyte Containing Lithium Ions

It is desirable that the electrolyte containing lithium ions is in contact with the negative electrode or is included or held in the negative electrode. This reduces the interface resistance of the negative electrode and allows the negative electrode charge-discharge reactions to proceed uniformly, which attains a high Coulomb efficiency and improves the cycle life performance. Examples of the electrolyte containing lithium ions include a liquid or gel nonaqueous electrolyte. Among the above-mentioned aluminum-ion-containing nonaqueous electrolytes, the ionic liquid in a composition that contains a lithium salt with an aluminum ion concentration of 50 mol % or less can be used as the electrolyte containing lithium ions. The gel electrolyte is obtained, for example, by adding a polymeric material and a gelling agent to a liquid electrolyte to form a gel.

The nonaqueous electrolyte is preferably a nonaqueous electrolyte that is less reactive with lithium metal and highly resistant to reduction. Examples of the nonaqueous electrolyte include a nonaqueous electrolyte including an organic solvent and a lithium salt dissolved in the organic solvent. Examples of the organic solvent include a cyclic carbonate such as propylene carbonate and ethylene carbonate, a linear carbonate such as dimethyl carbonate, dimethoxyethane (DME), diethoxyethane (DEE), tetrahydrofuran (THF), 2 methyl tetrahydrofuran (2Me-THF), a fluorinated cyclic carbonate (e.g., fluorinated ethylene carbonate), a fluorinated linear carbonate (e.g., fluorinated ethyl methyl carbonate), and a fluorinated ether. The kinds of the organic solvent may be one, or a mixed solvent of two or more.

Examples of the lithium salt include $LiPF_6$, $LiBF_4$, $LiClO_4$, $Li[(FSO_2)_2N]$, $Li[(CF_3SO_2)_2N]$, and $Li[(C_2F_5SO_2)_2N]$, etc. The kinds of the lithium salt may be one, two, or more.

The concentration of the lithium salt in the organic solvent may be in the range of 1 to 3 mol/L.

(5) Separator Having Lithium Ion Conductivity

The separator having lithium ion conductivity is a film or layer that is selectively permeable to lithium ions, namely, that is impermeable to cations other than lithium. In order to prevent the electrolyte in contact with the positive electrode surface, which is the nonaqueous electrolyte containing aluminum ions, from mixing with the electrolyte in contact with the negative electrode surface, which is the electrolyte containing lithium ions, the separator having lithium ion conductivity preferably has a non-communicating structure without any through-hole or is free from holes.

Examples of the lithium-ion conductive separator include an oxide having lithium ion conductivity, a sulfide having lithium ion conductivity, a phosphate having lithium ion conductivity, a polymer having lithium ion conductivity, a solid electrolyte having lithium ion conductivity, and a composite obtained by combining two or more of each component. The lithium-ion conductive separator may be a composite further including an inorganic material and/or an organic material in addition to the above components.

The lithium-ion conductive separator may be layered or a film.

As the lithium-ion conductive separator, a flexible separator that is a composite of a lithium-ion conductive inorganic solid electrolyte and a polymer may be used. This separator is selectively permeable to lithium ions, and is free from holes or has the non-communicating structure. Examples of the polymer include ethyleneoxide (PEO), polyethylene terephthalate, polyvinylidene fluoride (PVdF). By using this separator, only lithium ions can selectively move in the separator, and aluminum ions, anion species, and cation species in the positive electrode and ions other than lithium ions in the negative electrode are prevented from moving through the separator.

Examples of the lithium-ion conductive solid electrolyte include an oxide solid electrolyte having a garnet-type structure and a lithium phosphate solid electrolyte having a Sodium Super Ionic Conductor (NASICON) type structure. The oxide solid electrolyte having a garnet-type structure is highly resistant to reduction and has an advantage of a wide electrochemical window. Examples of the oxide solid electrolyte having a garnet-type structure include $Li_{5+x}A_xLa_{3-x}M_2O_{12}$ (where A is at least one selected from the group consisting of Ca, Sr, and Ba, M is at least one selected from the group consisting of Nb and Ta, $0 \leq x \leq 0.5$), $Li_3M_{2-x}L_2O_{12}$ (where M is at least one selected from the group consisting of Ta and Nb, L may contain Zr, $0 \leq x \leq 0.5$), $Li_{7-3x}Al_xLa_3Zr_3O_{12}$ ($0 \leq x \leq 0.5$), and $Li_7La_3Zr_2O_{12}$. Among them, each of $Li_{6.25}Al_{0.25}La_3Zr_3O_{12}$ and $Li_7La_3Zr_2O_{12}$ has high ionic conductivity and is electrochemically stable, and thus is excellent in discharge performance and cycle life performance.

Examples of the NASICON-type lithium phosphate solid electrolyte include those represented by $LiM_2(PO_4)_3$ (where M is one or more selected from Ti, Ge, Sr, Zr, Sn, Al, or Ca). In particular, $Li_{1+x}Al_xGe_{2-x}(PO_4)_3$ ($0 \leq x \leq 0.5$), $Li_{1+x}Al_xZr_{2-x}(PO_4)_3$ ($0 \leq x \leq 0.5$), and $Li_{1+x}Al_xTi_{2-x}(PO_4)_3$ ($0 \leq x \leq 0.5$) are preferable because they have high ionic conductivity and high electrochemical stability.

A thickness of the separator is preferably 20 to 200 μm. If the thickness falls below this range, the mechanical strength may decrease. If the thickness exceeds this range, the ion conduction resistance may increase.

(6) First Porous Layer

The secondary battery may include a first porous layer. The first porous layer may be interposed between the separator having lithium ion conductivity and the positive electrode. Making the first porous layer hold or be impregnated with the nonaqueous electrolyte containing aluminum ions allows the nonaqueous electrolyte containing aluminum ions to be present on or in the vicinity of the surface of the positive electrode. This can reduce the interface resistance between the positive electrode and the separator.

Examples of the first porous layer include a porous film made of polypropylene (PP), polyethylene (PE), polyimide, or the like, a nonwoven fabric made of a polymer such as cellulose, and a porous layer including particles made of an inorganic oxide such as alumina. A composite configured of stacked multiple types of layers may be used as the first porous layer. A thickness of the first porous layer may be in the range of 5 to 50 μm, more preferably in the range of 5 to 20 μm. The first porous layer may have a porosity in the range of 40 to 80%.

(7) Second Porous Layer

The secondary battery may include a second porous layer. The second porous layer may be interposed between the separator having lithium ion conductivity and the negative electrode. Making the second porous layer hold or be impregnated with the nonaqueous electrolyte containing lithium ions allows the nonaqueous electrolyte containing lithium ions to be present on or in the vicinity of the surface of the negative electrode. This can reduce the interface resistance between the negative electrode and the separator. As a result, the negative electrode charge-discharge reactions can proceed uniformly, a high Coulomb efficiency is attained, and the cycle life performance is improved. In a secondary battery with the negative electrode including lithium metal or a lithium alloy, by the negative electrode charge-discharge reactions uniformly proceeding, deposition of Li dendrites can be prevented. When the negative electrode contains a compound capable of having Li inserted and extracted, the second porous layer need not be provided due to the porous structure of the negative electrode active material containing layer.

Examples of the second porous layer include a porous film made of polypropylene (PP), polyethylene (PE), polyimide, or the like, a nonwoven fabric made of a polymer such as cellulose, and a porous layer including particles made of an inorganic oxide such as alumina. A composite configured of stacked multiple types of layers may be used as the second porous layer.

A thickness of the second porous layer may be in the range of 5 to 50 μm, more preferably in the range of 5 to 20 μm. The second porous layer may have a porosity in the range of 40 to 80%.

(8) Container Member

The second battery may include a container member. The container member includes a container having an opening portion, and a lid attachable to the opening portion of the container. The lid may be separate from or integral with the container. The container member is not limited to the structure shown in the drawings as long as the container member is capable of housing a positive electrode, a negative electrode, a separator, and an electrolyte. A container member having a shape corresponding to a prismatic, thin, cylindrical, or coin-shaped battery may be used.

Examples of the material constituting the container member include metal and a laminate film.

Examples of the metal include iron, stainless steel, aluminum, and nickel. When a metal can is used for the container, a plate thickness of the container is preferably 0.5 mm or less, more preferably in the range of 0.3 mm or less.

Examples of the laminate film include a multilayer film configured of an aluminum foil or stainless steel foil covered with a resin film. As the resin, a polymer such as polypropylene (PP), polyethylene (PE), nylon, or polyethylene terephthalate (PET) can be used. A thickness of the laminate film is preferably 0.2 mm or less.

An example of the secondary battery is shown in FIG. 1. FIG. 1 shows a cross section of the secondary battery taken along a first direction 20. The secondary battery includes a container member 1, an electrode group housed in the container member 1, a positive electrode terminal 10, and a negative electrode terminal 11. The container member 1 includes a rectangular cylindrical container provided with a bottom plate on one side, and a lid plate. The opposite side of the bottom plate of the container serves as an opening portion, and the lid plate is fixed to the opening portion by, for example, welding or caulking. The electrode group includes a positive electrode active material containing layer 2, a negative electrode active material containing layer 3, a first porous layer 4, a lithium-ion conductive separator 5, and a second porous layer 6, a positive electrode current collector 7, and a negative electrode current collector 8. The positive electrode active material containing layer 2 and the negative electrode active material containing layer 3 are stacked so as to face each other with the first porous layer 4, the lithium-ion conductive separator 5 and the second porous layer 6 interposed therebetween. The first direction 20 is a direction orthogonal to the stacking direction. The first porous layer 4 holds or is impregnated with a nonaqueous electrolyte containing aluminum ions. The first porous layer 4 is in contact with the other surface (for example, one surface or a principal surface intersecting the thickness direction) of the positive electrode active material containing layer 2. The positive electrode current collector 7 is in contact with the other surface of the positive electrode active material containing layer 2. The second porous layer 6 holds or is impregnated with an electrolyte containing lithium ions. The second porous layer 6 is in contact with one surface (for example, one surface or a principal surface intersecting the thickness direction) of the negative electrode active material containing layer 3. The negative electrode current collector 8 is in contact with the other surface of the negative electrode active material containing layer 3. Both end portions of the first porous layer 4, the lithium-ion conductive separator 5, and the second porous layer 6 in the first direction 20 protrude from the positive electrode active material containing layer 2 and the negative electrode active material containing layer 3. An insulating support 9a is disposed between one end portion of the first porous layer 4, the lithium-ion conductive separator 5, and the second porous layer 6 in the first direction 20, and the back surface of the lid plate. In addition, an insulating support 9b is disposed between the other end portion in the first direction 20 and the bottom surface. The lithium-ion conductive separator 5 is a film which is selectively permeable to lithium ions and which is free from holes or has a non-communicating structure. The inside of the container member 1 is partitioned into two spaces by the lithium-ion conductive separator 5, and there exist a space (positive electrode space) 21 defined by the separator 5, the insulating supports 9a and 9b, and the container member, and a space (negative electrode space) 22 defined by the separator 5, the insulating supports 9a and 9b, and the container member. The nonaqueous electrolyte containing aluminum ions in the positive electrode space 21 and the electrolyte containing lithium ions in the negative electrode space 22 do not cross or mix each other, and exist independently of each other.

The positive electrode terminal 10 and the negative electrode terminal 11 are provided on the lid plate with an insulating member (not shown). The positive electrode terminal 10 functions as an external positive electrode terminal and the negative electrode terminal 11 functions as an external negative electrode terminal. The positive electrode current collector 7 is electrically connected to the positive electrode active material containing layer 2 and positive electrode terminal 10. On the other hand, the negative electrode current collector 8 is electrically connected to the negative electrode active material containing layer 3 and negative electrode terminal 11.

According to the secondary battery having the structure shown in FIG. 1, since the lithium-ion conductive separator 5 can function as a partition wall, the contact between the nonaqueous electrolyte containing aluminum ions and the electrolyte containing lithium ions can be prevented. The secondary battery may have a structure that allows charge and discharge, and is not limited to the structure shown in FIG. 1.

The secondary battery according to the first embodiment includes: the positive electrode including the halide including one or more metal elements selected from the group consisting of copper, iron, nickel, cobalt, tin, and zinc, as the positive electrode active material; the negative electrode; the nonaqueous electrolyte containing aluminum ions; and the separator having lithium ion conductivity. According to the above secondary battery, the oxidation-reduction reactions according to the dissolution and deposition of the metal element of the halide efficiently proceed, which enables charge and discharge with a high Coulomb efficiency and improvement in the cycle life performance. Further, since the level of safety is high even if lithium metal is used for the negative electrode, a secondary battery with a voltage of 3V that is lightweight and of high energy density and capacity can be attained. Moreover, the secondary battery, by virtue of its high energy density, is suitable for a stationary power supply and space applications.

Second Embodiment

According to a second embodiment, a battery pack is provided. The battery pack includes the secondary battery according to the first embodiment. The battery pack may include one secondary battery according to the one embodiment or include a battery module configured of a plurality of the secondary batteries according to the one embodiment.

The battery pack according to the second embodiment may further include a protective circuit. The protective circuit has a function to control the charge and discharge of the secondary battery. Alternatively, a circuit included in equipment (for example, electronic devices, automobiles, and the like) where the battery pack serves as a power source may be used as the protective circuit for the battery pack.

Moreover, the battery pack according to the second embodiment may further include an external power distribution terminal. The external power distribution terminal is configured to externally output current from the secondary battery, and/or to input external current into the secondary battery. In other words, when the battery pack is used as a power source, the current is provided to the external via the external power distribution terminal. When the battery pack is charged, the charging current (including regenerative energy of motive force of vehicles such as automobiles) is provided to the battery pack via the external power distribution terminal.

Next, an example of the battery pack according to the second embodiment will be described with reference to the drawings.

Figure 2:
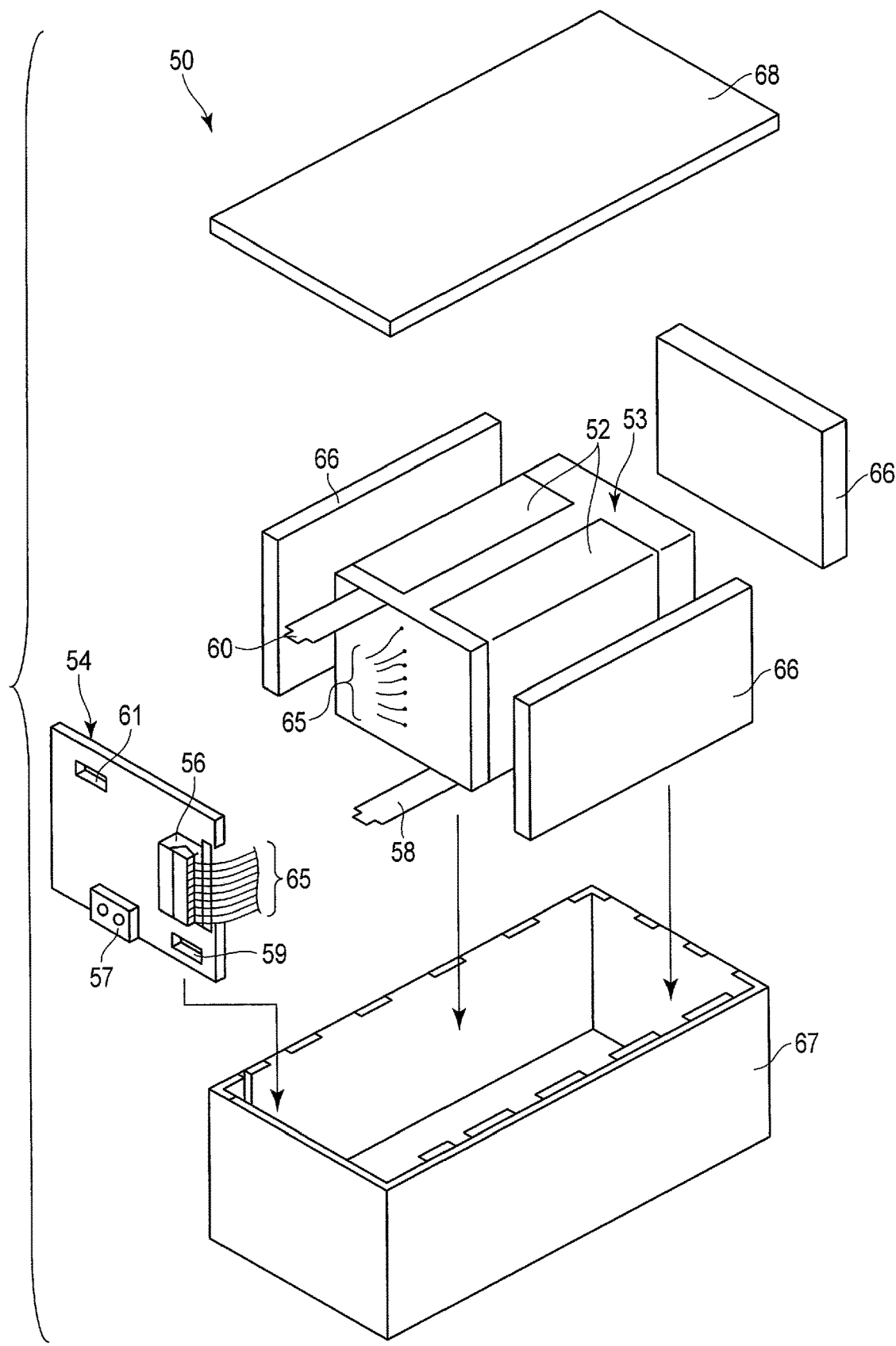
FIG. 2 is an exploded perspective view schematically showing an example of a battery pack according to an embodiment.
Figure 3:
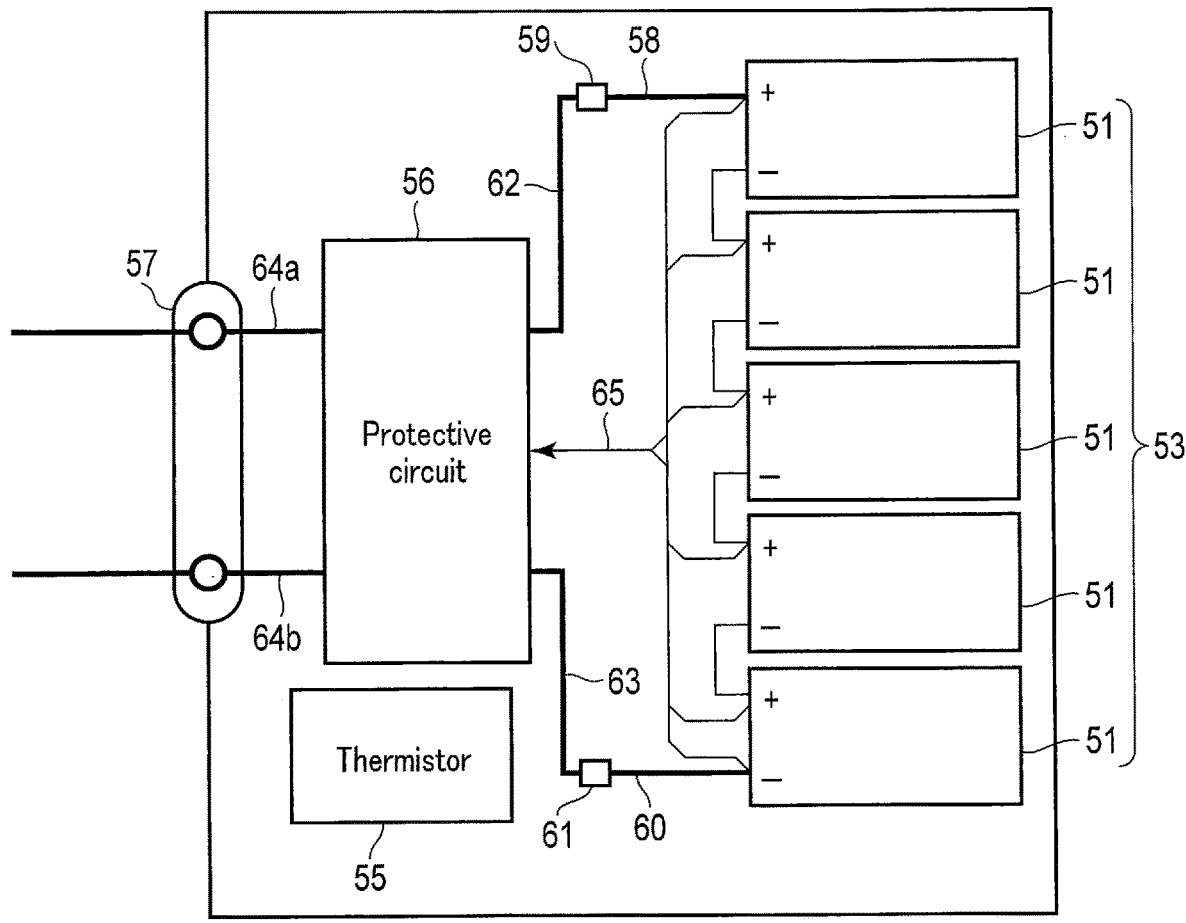
FIG. 3 is a block diagram showing an example of an electric circuit of the battery pack shown in FIG. 2.

FIG. 2 is an exploded perspective view schematically showing an example of the battery pack disassembled for each part according to the second embodiment. FIG. 3 is a block diagram showing an example of an electric circuit of the battery pack shown in FIG. 2.

FIGS. 2 and 3 show an example of a battery pack 50. The battery pack 50 shown in FIGS. 2 and 3 includes plural secondary batteries according to the embodiment. Plural secondary batteries 51 are stacked so that the negative electrode terminals and the positive electrode terminals are arranged in the same direction, and fastened with an adhesive tape 52 to configure a battery module 53. These secondary batteries 51 are electrically connected to each other in series as shown in FIG. 3.

A printed wiring board 54 is arranged to face the side plane of the secondary battery 51 where the negative electrode terminal and the positive electrode terminal extend out from. A thermistor 55, a protective circuit 56, and a power distribution terminal 57 to an external device as the external power distribution terminal are mounted on the printed wiring board 54 as shown in FIG. 5. An electric insulating plate (not shown) is attached to the surface of the printed wiring board 54 facing the battery module 53 to avoid unnecessary connection of the wires of the battery module 53.

A positive electrode-side lead 58 is connected to the positive electrode terminal located at the bottom layer of the battery module 53 and the distal end of the lead 58 is inserted into a positive electrode-side connector 59 of the printed wiring board 54 so as to be electrically connected. A negative electrode-side lead 60 is connected to the negative electrode terminal located at the top layer of the battery module 53 and the distal end of the lead 60 is inserted into a negative electrode-side connector 61 of the printed wiring board 54 so as to be electrically connected. The connectors 59 and 61 are connected to the protective circuit 56 through wires 62 and 63 formed on the printed wiring board 54.

The thermistor 55 detects the temperature of the secondary batteries 51, and the detection signal is sent to the protective circuit 56. The protective circuit 56 can shut down a plus-side wire 64a and a minus-side wire 64b between the protective circuit 56 and the power distribution terminal 57 to an external device under a predetermined condition. The predetermined condition indicates, for example, the case where the temperature detected by the thermistor 55 becomes a predetermined temperature or more. Another example of the predetermined condition indicates the case where the overcharge, overdischarge, or over-current of the secondary batteries 51 is detected. The detection of the overcharge and the like is performed on individual secondary batteries 51 or the entire secondary batteries 51. When each of the secondary batteries 51 is detected, the battery voltage may be detected, or a positive electrode or negative electrode potential may be detected. In the latter case, a lithium electrode to be used as a reference electrode is inserted into each of the secondary batteries 51. In the case of the battery pack of FIGS. 2 and 3, wires 65 for voltage detection are connected to each of the secondary batteries 51. Detection signals are sent to the protective circuit 56 through the wires 65.

Protective sheets 66 made of rubber or resin are arranged on three side planes of the battery module 53 except the side plane from which the positive electrode terminal and the negative electrode terminal protrude out.

The battery module 53 is housed in a housing container 67 together with each of the protective sheets 66 and the printed wiring board 54. That is, the protective sheets 66 are arranged on both internal surfaces in a long side direction and on one internal surface in a short side direction of the housing container 67. The printed wiring board 54 is arranged on another internal surface in a short side direction. The battery module 53 is located in a space surrounded by the protective sheets 66 and the printed wiring board 54. A lid 68 is attached to the upper surface of the housing container 67.

In order to fix the battery module 53, a heat-shrinkable tape may be used in place of the adhesive tape 52. In this case, the battery module is bound by placing the protective sheets on the both sides of the battery module, revolving the heat-shrinkable tape, and thermally shrinking the heat-shrinkable tape.

In FIGS. 2 and 3, the form in which the secondary batteries 51 are connected in series is shown. However, in order to increase the battery capacity, the batteries may be connected in parallel. Alternatively, the batteries may be formed by combining series connection and parallel connection. The assembled battery pack can be connected in series or in parallel.

The battery pack shown in FIGS. 2 and 3 includes one battery module. The battery pack according to the embodiments may include a plurality of battery modules. The plurality of battery modules are electrically connected in series, in parallel, or in a combination of series connection and parallel connection.

The form of the battery pack is appropriately changed in accordance with the application purpose. The battery pack according to the embodiment is preferably used for an application purpose requiring that excellent cycle performance is obtained at the time of a large current discharging. More specifically, the battery pack is used as a power supply for a digital camera, a battery for a vehicle such as a two- or four-wheeled hybrid electronic automobile, a two- or four-wheeled electronic automobile, an electric bicycle, or a railway vehicle (for example, an electric train), or a stationary battery. In particular, the battery pack is suitably used as a large-sized storage battery for a stationary power storage system or an in-vehicle battery for vehicles.

The battery pack according to the second embodiment includes the secondary battery according to the first embodiment. Therefore, the battery pack according to the second embodiment has a high capacity and a high energy, and is excellent in cycle life performance.

Third Embodiment

According to a third embodiment, a vehicle is provided. The vehicle includes the battery pack according to the second embodiment.

In the vehicle according to the third embodiment, the battery pack is configured, for example, to recover regenerative energy of motive force of the vehicle. The vehicle may include a mechanism configured to convert kinetic energy of the vehicle into regenerative energy.

Examples of the vehicle include a two- to four-wheeled hybrid electric automobile, a two- to four-wheeled electric automobile, a power-assisted bicycle, and a railway car.

The installation position of the battery pack in the vehicle is not particularly limited. For example, when installing the battery pack on an automobile, the battery pack can be installed in the engine compartment of the vehicle, in rear parts of the vehicle body, or under seats.

The vehicle may include plural battery packs. In this case, the battery packs may be electrically connected in series, connected in parallel, or connected in a combination of in series connection and in parallel connection.

Next, an example of the vehicle according to the third embodiment is explained with reference to the drawings.

Figure 4:
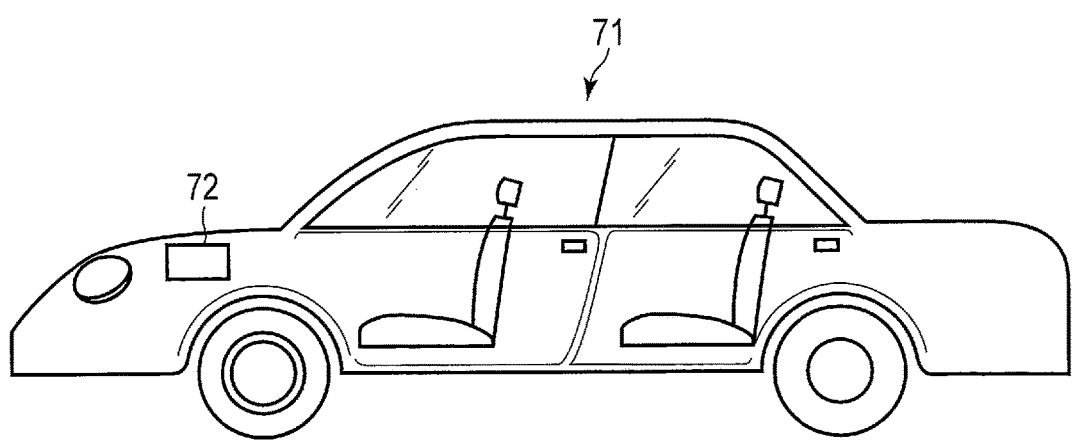
FIG. 4 is a cross-sectional view schematically showing an example of a vehicle according to an embodiment.

FIG. 4 is a cross-sectional view schematically showing an example of the vehicle according to the third embodiment.

The vehicle 71 shown in FIG. 4 includes a vehicle body and a battery pack 72 according to the second embodiment. In the example shown in FIG. 4, the vehicle 71 is a four-wheeled automobile.

The vehicle 71 may include plural battery packs 72. In this case, the battery packs 72 may be connected in series, may be connected in parallel, or may be connected by a combination of in-series connection and in-parallel connection.

In FIG. 4, the battery pack 72 is installed in an engine compartment located at the front of the vehicle body. As described above, the battery pack 72 may be installed in rear parts of the vehicle body, or under seats. The battery pack 72 may be used as a power source of the vehicle. In addition, the battery pack 72 can recover regenerative energy of motive force of the vehicle.

The vehicle according to the third embodiment includes the battery pack according to the second embodiment. Thus, the present embodiment can provide a vehicle that includes a battery pack having a high capacity, high energy and excellent cycle life performance.

Fourth Embodiment

According to a fourth embodiment, a stationary power supply is provided. The stationary power supply includes the battery pack according to the second embodiment. Note that the stationary power supply may include the secondary battery or the battery module, instead of the battery pack according to the second embodiment.

FIG. 5 is a block diagram showing an example of a system including a stationary power supply according to the fourth embodiment. FIG. 5 is a diagram showing an application example to stationary power supplies 112, 123 as an example of use of battery packs 300A, 300B according to the second embodiment. In the example shown in FIG. 5, a system 110 in which the stationary power supplies 112, 123 are used is shown. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from fuel sources such as thermal power or nuclear power. Electric power is supplied from the electric power plant 111 through the electric power network 116 and the like. In addition, the battery pack 300A is installed in the stationary power supply 112. The battery pack 300A can store electric power and the like supplied from the electric power plant 111. In addition, the stationary power supply 112 can supply the electric power stored in the battery pack 300A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 300A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 300B is installed in the stationary power supply 123. The customer side EMS 121 performs control to stabilize the customer side electric power system 113.

Electric power from the electric power plant 111 and electric power from the battery pack 300A are supplied to the customer side electric power system 113 through the electric power network 116. The battery pack 300B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 300B.

Note that the electric power stored in the battery pack 300B can be used, for example, for charging a vehicle such as an electric automobile. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

The stationary power supply according to the fourth embodiment includes the battery pack according to the second embodiment. Thus, the present embodiment can provide a stationary power supply that includes a battery pack having a high capacity, high energy and excellent cycle life performance.

EXAMPLES

Hereinafter, examples will be described in detail with reference to the drawings; however, the embodiment is not limited to the examples described blow.

Example 1

A porous positive electrode active material containing layer was produced so as to have a density of 2 g/cm$^3$ with copper (II) chloride ($CuCl_2$) as a positive electrode active material, acetylene black, graphite, and a polyethylene terephthalate binder contained in a weight ratio of 80:5:10:5. The positive electrode active material containing layer was attached by pressure onto a copper mesh current collector having a thickness of 15 μm to obtain a stack having a thickness of 410 μm. $AlCl_3$, 1-methyl-3-ethylimidazolium chloride (MEICl), and LiCl were mixed at a molar ratio of 2:0.9:0.1 to obtain an aluminum-ion-containing ionic liquid (molten salt) as the nonaqueous electrolyte containing aluminum ions. The value of Y1/Y2 is shown in Table 1. The obtained ionic liquid was injected into the positive electrode active material containing layer so that the positive electrode active material containing layer would contain 40 wt % of the ionic liquid, thereby producing a positive electrode. A first porous layer made of a cellulose nonwoven fabric having a thickness of 10 μm and a porosity of 65% was provided on the surface of the positive electrode active material containing layer facing the separator. The first porous layer was made to hold the nonaqueous electrolyte.

A lithium metal foil having a thickness of 250 μm was attached by pressure onto a copper current collector foil having a thickness of 10 μm to obtain a negative electrode. The capacity of the lithium metal was 4 times the capacity of the positive electrode. The lithium metal surface of the negative electrode was covered with a second porous layer that is a porous film made of polyethylene (PE) with a thickness of 10 μm and a porosity of 55%. An organic electrolyte solution was prepared by dissolving a lithium salt of $LiPF_6$ in a mixed solvent of ethylene carbonate (EC) and diethoxyethane (DEE) (in a volumetric ratio of 1:1), and the second porous layer was impregnated with the organic electrolyte solution.

As a lithium-ion conductive separator, a 50 μm-thick solid electrolyte plate made of $Li_{1.3}Al_{0.3}Ti_{1.7}(PO_4)_3$ was prepared. The solid electrolyte plate was free from communication holes and selectively permeable to lithium ions. The solid electrolyte plate was interposed between the positive electrode and the negative electrode, thereby providing an electrode group structure that prevents contact between the ionic liquid in the positive electrode and the lithium metal of the negative electrode. Further, this electrode group was housed in a metal container made of stainless steel with a thickness of 0.1 mm to produce a thin secondary battery (size: 1×105×105 mm; capacity: 2 Ah; intermediate voltage: 2.8 V; volumetric energy density: 508 Wh/l) having the structure shown in FIG. 1.

Examples 2 to 17

Thin secondary batteries were produced in the same manner as described in Example 1 except for the positive electrode active material, the nonaqueous electrolyte for the positive electrode, the lithium ion conductive separator, and the negative electrode shown in Table 1 below.

Here, AlCl$_3$/MEICl (2:1) indicates that AlCl$_3$ and 1-methyl-3-ethylimidazolium chloride (MEICl) were mixed at a molar ratio of 2:1 to obtain an aluminum-ion-containing ionic liquid (molten salt).

AlCl$_3$/dipropylsulfone (1:3) indicates that AlCl$_3$ and dipropylsulfone were mixed at a molar ratio of 1:3 to obtain an aluminum-ion-containing organic electrolyte solution. The aluminum-ion-containing ionic liquid (molten salt) of Example 17 was prepared in the same manner as in Example 1 except that 1,2-dimethyl-3-propyl imidazolium chloride (DMPICl) was used instead of MEICl.

The composite film of Example 10 was produced by the following process. Li$_{1.3}$Al$_{0.3}$Ti$_{1.7}$(PO$_4$)$_3$ particles having a specific surface of 50 m$^2$/g as determined by the BET method based on N$_2$ adsorption and an average size (diameter) of primary particle of 0.1 μm were mixed with polyethyleneoxide (PEO) at a weight ratio of 9:1 to form a composite. The obtained composition was applied to the surfaces of the positive electrode active material containing layer of the positive electrode and the negative electrode active material containing layer of the negative electrode, and a heat treatment at 60° C. for 24 hours was performed, thereby forming a composite film.

The composite film of Example 13 was produced by the following process. Li$_{1.3}$Al$_{0.3}$Zr$_{1.7}$(PO$_4$)$_3$ particles having a specific surface of 50 m$^2$/g as determined by the BET method based on N$_2$ adsorption and an average size (diameter) of primary particle of 0.1 μm were mixed with polyvinylidene fluoride (PVdF) at a weight ratio of 9:1 to form a composite. The obtained composition was applied to the surfaces of the positive electrode active material containing layer of the positive electrode and the negative electrode active material containing layer of the negative electrode, and a heat treatment at 60° C. for 24 hours was performed, thereby forming a composite film.

For the negative electrode of Example 11, a foil made of LiAl alloy (the Al content in the alloy was 50 wt %) and having a thickness of 50 μm was used.

The negative electrode of Example 12 was produced by the following process. Graphite powder and polyvinylidene fluoride (PVdF) were mixed at a weight ratio of 90:10, and the resulting mixture was kneaded in the presence of an organic solvent (N-methylpyrrolidone) to prepare a slurry. The obtained slurry was applied to a copper foil having a thickness of 15 μm, dried, and pressed, thereby obtaining a negative electrode. Lithium was inserted into the obtained negative electrode before the initial discharge.

Comparative Examples 1 to 7

Thin nonaqueous electrolyte secondary batteries were produced in the same manner as described in Example 1 except for the positive electrode active material, the nonaqueous electrolyte for the positive electrode, the lithium ion conductive separator, and the negative electrode shown in Table 2 below.

Comparative Example 8

As described in lines 39 to 65 on column 7 of U.S. Pat. No. 5,552,241, SCl$_3$AlCl$_4$ as a positive electrode was dissolved in a molten salt obtained by mixing 65 mol % of AlCl$_3$ and 35 mol % of 1,2-dimethyl-4-fluoropyrazolium chloride (DMFP). A negative electrode made of Li metal was disposed so that the positive electrode and the negative electrode were separated by a separator made of a glass filter, thereby producing a lithium battery.

For the obtained batteries of Examples 1 to 15 and 17, and Comparative Examples 1 to 4, 5, 6, and 8, the discharge capacity, the intermediate voltage, and the energy (Wh) were measured when the batteries were charged at a constant current of 200 mA at 30° C. for 10 hours to reach 4.0 V and then discharged at 200 mA to reach 1.5V. As a charge cycle test, a charge-discharge cycle in which the batteries were charged with a constant current of 200 mA at 30° C. for 10 hours to reach 4.0 V and then discharged at 200 mA to reach 1.5 V was repeated to determine the number of cycles at which the capacity retention ratio became 80% as a cycle life number. For the batteries of Example 16 and Comparative Example 7, as an overcharge-overdischarge cycle test, a charge-discharge cycle in which the batteries were charged with a constant current of 200 mA at 30° C. to reach 5 V and then discharged at 200 mA to reach 0 V was repeated to determine the number of cycles at which the capacity retention ratio became 80% as a cycle life number. The results are provided in Tables 3 and 4.

These measurement results are shown in Tables 3 and 4 below.

TABLE 1

| | Positive Electrode Active Material | Positive Electrode Electrolyte (molar ratio) | Y1/Y2 | Separator | Negative Electrode |
|---|---|---|---|---|---|
| Example 1 | CuCl$_2$ | AlCl$_3$/MEICl/LiCl (2:0.9:0.1) | 2.2 | Li$_{1.3}$Al$_{0.3}$Ti$_{1.7}$(PO$_4$)$_3$ | Li |
| Example 2 | NiCl$_2$ | AlCl$_3$/MEICl/LiCl (2:0.9:0.1) | 2.2 | Li$_{1.3}$Al$_{0.3}$Ti$_{1.7}$(PO$_4$)$_3$ | Li |
| Example 3 | CoCl$_2$ | AlCl$_3$/MEICl/LiCl (2:0.9:0.1) | 2.2 | Li$_{1.3}$Al$_{0.3}$Ti$_{1.7}$(PO$_4$)$_3$ | Li |
| Example 4 | SnCl$_2$ | AlCl$_3$/MEICl/LiCl (2:0.9:0.1) | 2.2 | Li$_{1.3}$Al$_{0.3}$Ti$_{1.7}$(PO$_4$)$_3$ | Li |
| Example 5 | ZnCl$_2$ | AlCl$_3$/MEICl/LiCl (2:0.9:0.1) | 2.2 | Li$_{1.3}$Al$_{0.3}$Ti$_{1.7}$(PO$_4$)$_3$ | Li |
| Example 6 | CuF$_2$ | AlCl$_3$/MEICl/LiCl (2:0.9:0.1) | 2.2 | Li$_{1.3}$Al$_{0.3}$Ti$_{1.7}$(PO$_4$)$_3$ | Li |
| Example 7 | FeF$_3$ | AlCl$_3$/MEICl/LiCl (2:0.9:0.1) | 2.2 | Li$_{1.3}$Al$_{0.3}$Ti$_{1.7}$(PO$_4$)$_3$ | Li |
| Example 8 | CuCl$_2$ | AlCl$_3$/MEICl (2:1) | 2 | Li$_{1.3}$Al$_{0.3}$Ti$_{1.7}$(PO$_4$)$_3$ | Li |

TABLE 1-continued

| | Positive Electrode Active Material | Positive Electrode Electrolyte (molar ratio) | Y1/Y2 | Separator | Negative Electrode |
|---|---|---|---|---|---|
| Example 9 | $CuCl_2$ | $AlCl_3$/dipropylsulfone (1:3) | — | $Li_{1.3}Al_{0.3}Ti_{1.7}(PO_4)_3$ | Li |
| Example 10 | $CuCl_2$ | $AlCl_3$/MEICl (2:1) | 2 | PEO/$Li_{1.3}Al_{0.3}Ti_{1.7}(PO_4)_3$ Composite Film (1:9) | Li |
| Example 11 | $CuCl_2$ | $AlCl_3$/MEICl/LiCl (2:0.9:0.1) | 2.2 | $Li_{1.3}Al_{0.3}Ti_{1.7}(PO_4)_3$ | Li-Al Alloy |
| Example 12 | $CuCl_2$ | $AlCl_3$/MEICl/LiCl (2:0.9:0.1) | 2.2 | $Li_{1.3}Al_{0.3}Ti_{1.7}(PO_4)_3$ | Li-Graphite |
| Example 13 | $CuCl_2$ | $AlCl_3$/MEICl/LiCl (2:0.9:0.1) | 2.2 | PVdF/$Li_{1.3}Al_{0.3}Ti_{1.7}(PO_4)_3$ Composite Film (1:9) | Li |
| Example 14 | $CuCl_2$ | $AlCl_3$/MEICl/LiCl (2:0.9:0.1) | 2.2 | $Li_7La_3Zr_2O_{12}$ | Li |
| Example 15 | $FeCl_2$ | $AlCl_3$/MEICl/LiCl (2:0.9:0.1) | 2.2 | $Li_{1.3}Al_{0.3}Ti_{1.7}(PO_4)_3$ | Li |
| Example 16 | $CuCl_2$ | $AlCl_3$/MEICl (2:1) | 2 | $Li_{1.3}Al_{0.3}Ti_{1.7}(PO_4)_3$ | Li |
| Example 17 | $CuCl_2$ | $AlCl_3$/MEICl/LiCl (2:0.9:0.1) | 2.2 | $Li_{1.3}Al_{0.3}Ti_{1.7}(PO_4)_3$ | Li |

TABLE 2

| | Positive Electrode Active Material | Electrolyte (molar ratio) | Separator | Negative Electrode |
|---|---|---|---|---|
| Comparative Example 1 | $CuCl_2$ | $CuCl_2$ Aqueous Solution (30 wt %) | $Li_{1.3}Al_{0.3}Ti_{1.7}(PO_4)_3$ | Li |
| Comparative Example 2 | $FeCl_2$ | $FeCl_2$ Aqueous Solution (30 wt %) | $Li_{1.3}Al_{0.3}Ti_{1.7}(PO_4)_3$ | Li |
| Comparative Example 3 | $NiCl_2$ | $NiCl_2$ Aqueous Solution (30 wt %) | $Li_{1.3}Al_{0.3}Ti_{1.7}(PO_4)_3$ | Li |
| Comparative Example 4 | $LiFePO_4$ | 1M $LiPF_6$-PC/DEE (1:1) | PE Porous Film | Li |
| Comparative Example 5 | $CuCl_2$ | 1M $LiPF_6$-PC/DEE (1:1) | PE Porous Film | Li |
| Comparative Example 6 | $CuCl_2$ | 1M $LiPF_6$-PC/DEE (1:1) | $Li_{1.3}Al_{0.3}Ti_{1.7}(PO_4)_3$ | Li |
| Comparative Example 7 | $LiFePO_4$ | 1M $LiPF_6$-PC/DEE (1:1) | PE Porous Film | Li |
| Comparative Example 8 | $SCl_3AlCl_4$ | $AlCl_3$/DMFP (65/35 mol %) | Grass Filter | Li |

TABLE 3

| | Discharge Capacity (Ah) | Intermediate Voltage (V) | Energy (Wh) | Cycle Life Number |
|---|---|---|---|---|
| Example 1 | 2.0 | 2.8 | 5.6 | 600 |
| Example 2 | 1.8 | 2.4 | 4.54 | 500 |
| Example 3 | 1.9 | 2.4 | 4.56 | 400 |
| Example 4 | 1.7 | 2.4 | 4.08 | 600 |
| Example 5 | 2.2 | 1.9 | 4.18 | 400 |
| Example 6 | 1.8 | 2.8 | 5.04 | 200 |
| Example 7 | 1.8 | 2.4 | 4.32 | 500 |
| Example 8 | 2.1 | 2.8 | 5.88 | 300 |
| Example 9 | 1.5 | 2.6 | 3.9 | 200 |
| Example 10 | 1.9 | 2.6 | 4.94 | 300 |
| Example 11 | 1.5 | 2.5 | 3.75 | 600 |
| Example 12 | 1.2 | 2.6 | 3.12 | 700 |
| Example 13 | 2.0 | 2.8 | 5.6 | 300 |
| Example 14 | 2.0 | 2.9 | 5.8 | 500 |
| Example 15 | 1.7 | 2.3 | 3.91 | 300 |
| Example 16 | 2.0 | 2.8 | 5.6 | 200 |
| Example 17 | 2.0 | 2.8 | 5.6 | 700 |

TABLE 4

| | Discharge Capacity (Ah) | Intermediate Voltage (V) | Energy (Wh) | Cycle Life Number |
|---|---|---|---|---|
| Comparative Example 1 | 1.0 | 2.4 | 2.4 | 0 |
| Comparative Example 2 | 0.8 | 1.8 | 1.44 | 0 |
| Comparative Example 3 | 1.2 | 2.0 | 2.2 | 100 |
| Comparative Example 4 | 1.0 | 3.4 | 3.4 | 150 |
| Comparative Example 5 | 1.2 | 2.4 | 2.88 | 10 |
| Comparative Example 6 | 0.5 | 2.8 | 1.4 | 50 |
| Comparative Example 7 | 1.0 | 3.4 | 3.4 | 50 |
| Comparative Example 8 | 2.5 | 2.2 | 5.5 | 10 |

As is clear from Tables 1 to 4, the secondary batteries of Examples 1 to 17 were excellent in discharge capacity, energy, and cycle life performance as compared with Comparative Examples 1 to 8. Comparative Example 8 corresponds to the lithium battery described in U.S. Pat. No. 5,552,241. In the lithium battery of Comparative Example 8, the discharge reaction occurs because of the reduction reaction of S. In this battery, the discharge product of S contained in the positive electrode active material is eluted and reacts with lithium to produce lithium sulfide. This production reaction accelerates the self-discharge. In addition, this reaction is irreversible, and the lithium sulfide further produced increases the battery resistance. As a result, the lithium battery of Comparative Example 8 had a short charge-and-discharge cycle life.

By comparing Examples 1 to 7, and 15, it can be seen that Example 1, in which CuCl$_2$ was used for the positive electrode active material, was superior in both the energy and cycle life performance compared to the other Examples. By comparing Examples 1, 8, and 9, it can be seen that Example 1, in which the aluminum halide, the ionic liquid, and the lithium salt were included as the nonaqueous electrolyte containing aluminum ions, was superior in the cycle life performance to the other Examples. By comparing Examples 1, 11, and 12, it can be seen that Example 1, which used lithium metal for the negative electrode, was superior in both the energy and cycle life performance compared to the other Examples. From the comparison of Examples 8 and 10, it can be seen that Example 8, in which the solid electrolyte plate was used as the lithium-ion conductive separator, was superior in the energy performance compared to Example 10. By comparing Example 16 and Comparative Example 7, it was confirmed that the secondary battery of the embodiment was also excellent in overcharge and overdischarge performance.

The secondary battery according to at least one embodiment or example described above includes: the positive electrode including the halide including one or more metal elements selected from the group consisting of copper, iron, nickel, cobalt, tin, and zinc, as the positive electrode active material; and the nonaqueous electrolyte containing aluminum ions, and thus can improve the energy density and the cycle life performance. The secondary battery is also excellent in overcharge performance and overdischarge performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
a positive electrode including a metal halide selected from at least one of CuF$_x$ (0<x≤2) or CuCl$_x$ (0<x≤2), and a cation of metal element of the metal halide, as a positive electrode active material;
a negative electrode including one or more selected from the group consisting of lithium metal, a lithium alloy, and a compound capable of having Li inserted and extracted, as a negative electrode active material;
a nonaqueous electrolyte containing aluminum ions, an ionic liquid and a lithium ion, and is in contact with at least part of the positive electrode;
an electrolyte being in contact with at least part of the negative electrode; and
a separator having lithium ion conductivity comprising a lithium-ion conductive solid electrolyte, and being interposed between the positive electrode and the negative electrode, thereby the nonaqueous electrolyte and the electrolyte existing independently of each other,
wherein the positive electrode comprises:
a positive electrode active material containing a layer including the positive electrode active material; and
a positive electrode current collector including a porous material, a mesh or a foil, and each of the porous material, the mesh, and the foil is made of copper.

2. The secondary battery according to claim 1, wherein the ionic liquid comprises:
one or more selected from the group consisting of an imidazolium salt and a quaternary ammonium salt.

3. The secondary battery according to claim 1, wherein the ionic liquid is made of an anion and one or more cations selected from the group consisting of an alkylimidazolium cation and a quaternary ammonium cation.

4. The secondary battery according to claim 1, wherein the electrolyte contains lithium ions, and is disposed between the negative electrode and the separator having lithium ion conductivity.

5. The secondary battery according to claim 1, wherein the separator having lithium ion conductivity is selectively permeable to lithium ions.

6. The secondary battery according to claim 1, wherein the electrolyte is at least one of a liquid nonaqueous electrolyte or a gel nonaqueous electrolyte.

7. The secondary battery according to claim 1, wherein the electrolyte comprises an organic solvent and a lithium salt dissolved in the organic solvent.

8. The secondary battery according to claim 1, wherein the one or more metal elements of the positive electrode current collector is the same as the metal element of the metal halide.

9. A battery pack comprising the secondary battery according to claim 1.

10. The battery pack according to claim 9, further comprising:
an external power distribution terminal; and
a protective circuit.

11. The battery pack according to claim 9, comprising plural of the secondary battery, the secondary batteries being electrically connected in series, in parallel, or in a combination of in-series and in-parallel.

12. A vehicle comprising the battery pack according to claim 9.

13. A stationary power supply comprising the battery pack according to claim 9.

* * * * *